United States Patent [19]
Deschuytere et al.

[11] Patent Number: 6,160,643
[45] Date of Patent: *Dec. 12, 2000

[54] COLOR NEGATIVE SCANNING AND TRANSFORMING INTO COLORS OF ORIGINAL

[75] Inventors: Frank Deschuytere, Beveren; Chris Tuijn, Lier, both of Belgium

[73] Assignee: Agfa Gevaert N.V., Mortsel, Belgium

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/376,162

[22] Filed: Jan. 20, 1995

[30] Foreign Application Priority Data

Feb. 15, 1994 [BE] Belgium .............................. 09400178

[51] Int. Cl.$^7$ ...................................................... H04N 1/46
[52] U.S. Cl. ............................................................. 358/504
[58] Field of Search ............................ 348/112; 358/506, 358/515, 518, 523, 487, 527, 504, 532; 382/162, 167, 169, 141

[56] References Cited

U.S. PATENT DOCUMENTS

| | | | |
|---|---|---|---|
| 5,060,061 | 10/1991 | Shishido et al. | 358/506 |
| 5,283,671 | 2/1994 | Stewart et al. | 358/532 |
| 5,287,418 | 2/1994 | Kishida | 358/527 |
| 5,387,988 | 2/1995 | Hiratsuka et al. | 358/518 |
| 5,646,750 | 7/1997 | Collier | 358/518 |

*Primary Examiner*—Jerome Grant, III
*Attorney, Agent, or Firm*—Edward L. Kelley

[57] ABSTRACT

An apparatus and a method are disclosed for digitizing a color negative picture and correcting the image signals in a way that they are linearly related to the luminance of the photographed scene for grey tones in the scene. A second embodiment allows obtaining on the basis of the color-corrected image signals a reproduction of true color of the scene on a color display unit. For determining the correction, use is made of the characteristic system curve indicating for each of the color components the relation between the luminance of a neutral color swatch in the scene and the density sensed by the scan system. Several methods for drafting said system curve are described. Furthermore, the way of obtaining the color-corrected image signals by means of a color transformation and the way of determining the transformation are explained.

23 Claims, 2 Drawing Sheets

COLOR NEGATIVE SCANNING AND TRANSFORMING INTO COLORS OF ORIGINAL

DESCRIPTION

1. Field of the Invention

The present invention relates to a method and an apparatus for digitising colour negative pictures on an image carrier and for transforming the image signals in order to make them proportional to the spectral intensities of the photographed scene. Said method is intended for use in electronic colour scanners and pre-press systems.

2. Description of the Prior Art

It is known in conventional photography to make an imagewise reproduction of a scene, obtaining thereby a positive print. On the basis of the positive print, digital colour values can be generated that are suited for generating an image on a display unit or on a reproduction. Said digital colour values for the colour image on the print are obtained by the steps of:

separating the colour image in a number of colour components;

converting every colour component in electrical colour values by means of a colour scanner;

transforming the electrical colour values in digital colour values by means of a transformation for obtaining a reproduction of true colour of the print; and recording digital colour values on an image carrier suited for the reproduction process selected.

A digitiser is known to convert by means of a digitisation an optical image into electric signals giving each individual signal an indication of the optical density of a very limited part (pixel) of the carrier. On colour images, distinct spectral densities are distinguished that are defining the colour components in which the colour image is being analyzed. The expression "digitisation" in the present context refers to the conversion of an optical image into electric digital image signals. As a result, image data in electronic form is generated, e.g. in the way described herein below.

A colour image is exposed to any illuminant element emitting e.g. white light. The so generated light image resulting from the reflection or transmission of the emitted light is presented, possibly after directing it through a colour filter, pixel for pixel to a photosensitive member, which converts the pixel intensity of the light image in e.g. an analogue electric signal that is sampled and, possibly after amplification, presented to an ADC (analogue-to-digital converter) generating on the basis of the analogue electric signal a digital electric image signal, said image signal being representative of the light image presented. Said image signal in digital form is suited for being transferred by means of any transmission means, e.g. an electrical or optical cable, to a device arranged for storing the image signals in a volatile (random access memory) or fixed (disk) storage means. The image signals may be retrieved later on and utilised for controlling an image recording or reproduction system that converts the image in electronic form into optical density variations on an image carrier thus making it again available for visual perception.

An electrical colour value is each of the analogue or digital electric signals that constitutes, together with a number of similar signals, the representation of an image. Said similar signals may be applied successively and evenly spaced in time and vary continuously on an electric conductor, such as a coaxial cable in analogue video applications, alternatively they may be digital. The moment at which the image signal will be applied commonly determines the position of the pixel on the carrier said image signal is corresponding to. In many cases the voltage amplitude of said image signal is proportional to the optical density at the corresponding location on the carrier.

The image signal may be stored in digital form in a memory unit. For an image signal in digital form, commonly eight storage elements are used, each of which may represent a zero-state and a one-state, so that to every digital image signal 256 discrete values may be assigned. For particular applications, especially if the dynamic range or optical density range of an image to be digitised is uncertain, it is advantageous to utilise twelve or thirteen bits per image signal, increasing thereby the number of discrete values up to 4096 and 8192 respectively. To each of these discrete values a certain optical density for image processing and recording may be assigned, allowing an optimum visual-perceptibility and aesthetic appearance of the image on a carrier on which it is to be recorded. If the image involved is a colour image, several image signals will be generated for every location or pixel on the carrier. The colour signal from a pixel on the image is commonly separated in three colour components, i.e. red, green and blue (RGB), either by exposing the image successively to the above-mentioned colours and sampling the electric signals of a photosensitive member, on which the light impinges, or by exposing the image to white light with a broad spectrum and filtering the light reflected or transmitted by the image through a red, green or blue filter, before it impinges on a photosensitive member. Usually, for every pixel three colour signals are generated, i.e. red, green and blue.

Conversion into electrical colour values is referring to the recording and short-term storage of, e.g., an analogue electric signal generated by a photosensitive member. If but a single photosensitive member is present (occasionally one for each of the colour components), as in the case of conventional drum scanners, said photosensitive member shifts its position with respect to the colour image, so that at a given moment every basic picture element, i.e. the pixel, is emitting light to said photosensitive member. At that instant, the electric signal generated by the member is amplified with a gain G and compared to a reference voltage $V_0$. If need be, the amplification may proceed on a non-linear way for:

providing an analogue signal of which equal level differences correspond to non-equal optical density differences on the carrier, however, e.g. to equal perceptibility differences purposefully performing a transformation on the analogue electrical colour values provided by the photosensitive member.

The so obtained new electric signal is sampled and made available in digital form to a storage means, where it will be stored for further processing.

A colour scanner is a digitiser arranged for separating light into two or more spectral bands, allowing a colour image to be divided into as many colour components as there are spectral bands.

Preferably, the spectral bands are selected in a way that the colour image may be reconstituted by combining the colour components.

A colour component of the image is the full image obtained by making the light travel along the same path as on the colour scanner. If, e.g., the image is exposed to light passing through a red filter for obtaining the red image signals, the red colour component is produced. The term colour components in the present context refers to scanner-related colour components.

As described above, the colour components or the spectral bands of a pixel are obtained by means of colour filters or different colour exposures. In U.S. Pat. No. 5,157,516 several systems are disclosed. Converting electrical colour values into digital colour values by means of a transformation may be effected:

by non-linear amplification of the analogue signals as described above;

by modification of the numerical value of the digitised image signals; or by a combination of both processes.

The electrical colour values may be analogue or digital. The expression digital colour values as used in the present invention refers to the colour values corrected by a transformation.

Positive colour images are currently digitised by means of a colour scanner. A positive colour image is a reproduction of more or less true colour of any real scene that has been recorded, e.g. photographically, at an earlier time. A positive colour image may be provided on a transparent carrier such as in the case of transparencies. A colour photograph is an alternative form of a positive colour image, mainly on an opaque carrier, e.g. paper. For a colour photograph usually a colour negative picture on a transparent carrier is available, since the common process in colour photography consists in first exposing a photographic negative material to an image, formed in a camera, of the scene to be photographed. After developing the transparent photographic material, a positive print may be obtained by exposing a colour-sensitive material on an opaque support to the image on the transparent support.

It will be understood that the transparent negative material contains at least the same amount of image information as the positive print thereof. It can even be assumed that the negative material contains more image information. That assumption is altogether true for overexposed and underexposed negatives, which contain a lot of information that can hardly be rendered on a positive image in a correct way by the photographic process. A colour negative film by itself exhibits a wide density range, typically from approx. 0 to 4 D, and, moreover, the subject brightness range of the photographed scene is rendered in compressed form on the negative material. As a result, a colour negative film exhibits a large operating window that cannot be complied with by a slide film. Therefore, it is advantageous to photograph one and the same scene by means of a colour negative film instead of a slide film, if the photographic recording of a maximum of information is aimed at. However, it remains a problem making an optimum use of said information for obtaining a reproduction that is rendering the positive image. That problem resides among others in the fact that in the art of colour photography several processes are applied for allowing a true-colour rendering of the largest possible range of hues and shades on the positive print. In Hunt R. W. G., "The Reproduction of Colour in Photography, Printing and Television", 4th ed., 1987, chapters 12 and 15, methods are disclosed for neutralising the inter-image effects in the negative and positive images by means of colour masking, colour couplers and further photographic processes. In addition, every manufacturer of material for colour photography will apply particular processes and introduce colour changes in the negative material for obtaining the most satisfactory result on the final positive print. The negative material and the material for making the positive print are thus matched one to the other. It may occur that two positive prints obtained with distinct photographic material types are very similar, although the colour-negative intermediate pictures are markedly differing. In practice, for the above-mentioned reasons, no negatives are digitised for obtaining reproductions of true colour but rather positive images are used as a basis, although the latter may have a restricted information content as stated above.

According to the conventional process a true rendering of the positive print is aimed at. Since the appearance of the positive print is further depending on a considerable number of sometimes subjective parameters, and, furthermore, particular hues with respect to the scene may have disappeared, the reproduction obtained by digitising a positive image will be of a poorer quality than the quality that might be provided theoretically by digitising a colour negative picture and correctly utilising the obtained image information.

In WO 91/10316 a method is disclosed for scanning inter alia images originally captured on negative film, and conversion of the RGB image-bearing signals from a reflection or transmission scanner to a storage metric corresponding to the relative trichromatic exposure values received when the original scene was captured. The conversions are derived from images of test objects of known reflectances illuminated by known light sources, and by calculating trichromatic exposure values R'G'B'. A transform is created relating the RGB image-bearing signal values to the known R'G'B' exposures of the corresponding test colours. This transformation requires at least following steps:

1) Conversion of RGB image-bearing signals to RGB densities by using appropriate 1-dimensional look-up-tables.

2) Adjustment of the RGB densities from step 1 by using a 3 by 3 matrix

3) Adjustment of the RGB densities from step 2 by another matrix operation or 3-dimensional LUT 4) Optional individual transformation through 1-dimensional LUTS, such that the neutral scale densities of the input film are transformed to the neutral scale exposures of that film 5) Optional further transformation by another matrix operation for referring to a reference image-capturing device.

This method of calculating trichromatic exposure values makes the mathematical problem difficult to solve and will require a serious amount of computational effort to:

establish the transformation formula(e); and apply the transformation formula(e) to the scanned signals in the large number of steps.

This approach has also the disadvantage that only after four transformation steps, the objects having a neutral colour in the original image, will be electronically represented by signals indicating a neutral colour (e.g. r=g=b). A three-dimensional colour transformation is thus required for all colours.

OBJECT OF THE INVENTION

It is an object of the present invention to obtain a reproduction of the image of a scene by digitising the colour photographic negative picture of said scene.

It is a further object of the present invention to correct the digitised image signals by a transformation in such a way that the corrected image signals are represented by values that are proportional to the spectral luminance of the pixels of the scene represented by the image signals.

It is another object of the present invention to determine tone curves in the transformation without the need of recurring to data on the scene and of having disposal of a photographic positive image derived from the colour negative picture.

It is a further object of the invention to establish correspondence between specific colours of the original scene and digital colour values by simple transformations.

It is still another object of the invention to determine an additional colour correction that is eliminating colour shifts resulting from the photographic process and the spectral restrictions of the digitiser.

SUMMARY OF THE INVENTION

The present invention relates to a method for generating digital colour values, suitable for rendering the original image of a scene on a colour monitor or on a colour reproduction, by digitizing a colour negative image representing said original image, comprising the following steps:

separating the colour negative image in a plurality of colour components;

converting each colour component in electrical colour values by an image scanner;

establishing for each said colour component a relation between portions of the original image and the corresponding electrical colour value;

transforming said electrical colour values to digital colour values according to said relations; characterised in that each said relation is a one to one relation between luminance of said portions of the original image and the corresponding electrical colour value.

The advantage of scanning colour negative pictures resides in the fact that an optimum use is made of the image information—undeniably contained in such pictures—for obtaining reproductions of the scene electronically. It may occur that some information may get lost, due to specified adjustments for obtaining the positive image. Although this information is contained in the colour negative picture, and is preferably contained in reproductions, it is lost by the photographic process.

An additional advantage resides in the fact that there is no need for making a positive image, which commonly requires a supplementary photographic step.

Although the negative image is not a "mathematic negative" of the scene or of the positive print, it is still possible to obtain a reproduction of true colour by using the method of the present invention, be it within the limits of the reproduction process. The digitisation of colour negative pictures, while taking due consideration of the characteristics of the negative material, offers the additional benefit of being applicable to photographic material of various manufacturers.

When transforming the digitised image signals of the colour negative picture, the inventive method will try to make the image signals proportional to the luminance of the scene itself rather than making an attempt to reconstitute an image of true colour of a positive print of a scene according to the methods known in the art.

Taking the scene as a reference is advantageous, because it reduces the risk of hues getting lost. To that end, however, the characteristic features of the recording system, the colour negative film and the scanner should be taken into account.

The colour signals obtained by scanning the negative image have to be subjected to a non-linear transformation in order to neutralise the photographic effects that are unwanted for the digital image. The expressions typical to the present invention are defined herein below.

Contrary to the method as described in the prior art document WO 91/10316 cited above, preferably a relation is established between the electrical colour value of each individual colour component and the luminance of neutrally coloured objects in the original image or scene. Instead of dealing with trichromatic exposure values R'G'B' from the original image, rendering the mathematical problem to be solved a three-dimensional problem, this invention deals with the luminance $L_V$ of neutrally coloured objects in the scene only, to derive the relationship between the original image and the scanned colour components. This makes the mathematical problem less difficult to solve and will require less computational effort to:

establish the transformation formula(e); and apply the transformation formula(e) to the scanned signals.

This approach has also the advantage that after the first one-dimensional look-up table transformation the objects having a neutral colour in the original image, will be also electronically represented by signals indicating a neutral colour (i.e. r=g=b). A three-dimensional colour transformation is then only necessary for more saturated colours.

A colour negative picture—the inventive process is based upon—is perceived by the human eye as optical density differences on a transparent or opaque carrier. The image is a continuous-tone image, continuous tone corresponding to the common meaning of images with a virtually continuous rendering of optical density as perceived by the eye. The term "negative" in the expression colour negative is restricting the images of the inventive process to images the colours of which are essentially complementary to the colours of the scene of which the colour negative picture is a representation. A red object in the scene will appear on the colour negative picture as a cyan separation image. A pale grey object in the scene appears as dark grey on the colour negative. As described above, photographic processes give rise to colour shifts or colour casts in the colour negative picture. Despite of the colour shifts such images should be classified under the expression colour negative picture.

The expression photographic parameters is referring to among others:

the unwanted exposure of the scene, e.g. in case of flash lamp exposure, abundant blue light in a sunny snowy landscape, an insufficiently exposed or overexposed scene, etc.; in some cases the specific exposure produces an intended effect, such as a picture taken at sunset;

the camera features, among which the lenses used and the focal length the diaphragm the shutter time;

the spectral sensitivity of the various colour layers characterised by the dye concentration in the colour layer resulting from an exposure at a given wavelength;

the features of the developing process;

the spectral transmission characteristics of the colour layers, i.e. the light transmission as a function of wavelength.

The expression scanner parameters is referring to among others:

the spectral characteristics of the exposure module, i.e. the luminance distribution in the various wavelength ranges of the illuminant in the scanner;

the spectral characteristics of the colour filters, i.e. the light transmission of the colour filter as a function of the wavelength of the incident light;

the spectral sensitivity of the photosensitive members, i.e., e.g., in the case of CCD's (charge-coupled devices)

the amount of electrical charge built-up by a constant exposure at a given wavelength of the incident light;

the inherent transformations the electric signals are subjected to, which may be, e.g., a logarithmic transformation, a γ-correction or a linear transformation realised by means of a gain G and a reference voltage $V_0$.

The method of the present invention also applies to a system generating image signals for cyan, magenta and yellow (CMY). Every other system, apart from RGB and CMY, describing a full or even an incomplete colour space can be used for representing a colour by means of the image signals according to the invention. Moreover, some methods of the present invention can be applied successfully to black-and-white negative pictures.

The transformation is initially realised by the implementation of a tone curve. Although usually a look-up table or LUT is used to that end, the method of the present invention is not limited thereto. A tone curve generally means a mathematic relation describing the uni-dimensional transformation of electrical colour values into digital colour values.

The physical realisation can be achieved in several ways:

by means of an electronic circuit transforming analogue image signals into analogue and further digital image signals in accordance with a relation indicated by the tone cure;

by storing in a digital memory, e.g. RAM, in successive memory cells a value for the image signals corrected; whereas the uncorrected image signal in digital representation may be used as index in this series of memory cells or LUT.

Frequent reference is made herein below to two characteristic curves, being interrelated, but the definition and finality of which are markedly distinct.

The characteristic film curve is a graph plotting on the x-axis the logarithm of the exposure $H_V$ expressed in lux seconds (lxs) versus on the y-axis the optical density (non-dimensional) obtained after exposure to $H_V$ and after processing of the colour photographic negative.

The characteristic system curve is for each of the colour components a graph plotting on the x-axis the corresponding logarithm of the luminance $L_V$ expressed in candela a square metre (cd/m$^2$) of an object with a neutral colour in the scene versus on the y-axis respectively the colour density $D_R$, $D_G$, $D_B$. The luminance of a point in the scene results from light that is falling on the scene and is partially reflected by it. Part of the reflected light is captured by the photographic image carrier in the camera as a result of the imaging of the scene. The amount of light impinging on the image carrier defines the exposure $H_V$ as described above. The expression neutral colour used herein below refers to every colour obtained by mixing exclusively black and white, i.e. only white, black, pale grey, dark grey, etc.

The colour density $D_R$ of a point on the developed negative is, except for an arbitrary additive constant, the negative logarithm of the exposure $H_R$ impinging on the photosensitive member receiving the light beam provided by the red image component. A similar definition applies to the characteristic system curves $D_G=f_G(L_V)$ and $D_B=f_B(L_V)$. Hence, the three characteristic system curves have an x-axis $L_V$ with the same meaning and an y-axis of different meaning. It is clear that the x-axis is universal, whereas the y-axis is substantially depending on:

the spectral sensitivity of the colour layers in the photographic imaging material to neutral light;

the spectral characteristics of the dyes formed in the photographic imaging material;

the spectrum of the illuminant in the scanner;

the spectral characteristics of the colour filters in the scanner;

the spectral sensitivity of the photosensitive sensors in the scanner, which are converting the filtered light signal into an electric signal.

As the above-mentioned curves are depending on the system constituted by both the imaging material and the scanner with the specific scanner parameters, they are called the characteristic system curves as opposed to the characteristic film curves which are merely depending on the photographic imaging material.

BRIEF DESCRIPTION OF THE DRAWINGS

The present invention is described herein below by way of illustration referring to the enclosed diagrams wherein.

DETAILED DESCRIPTION OF THE INVENTION

Figure 1:
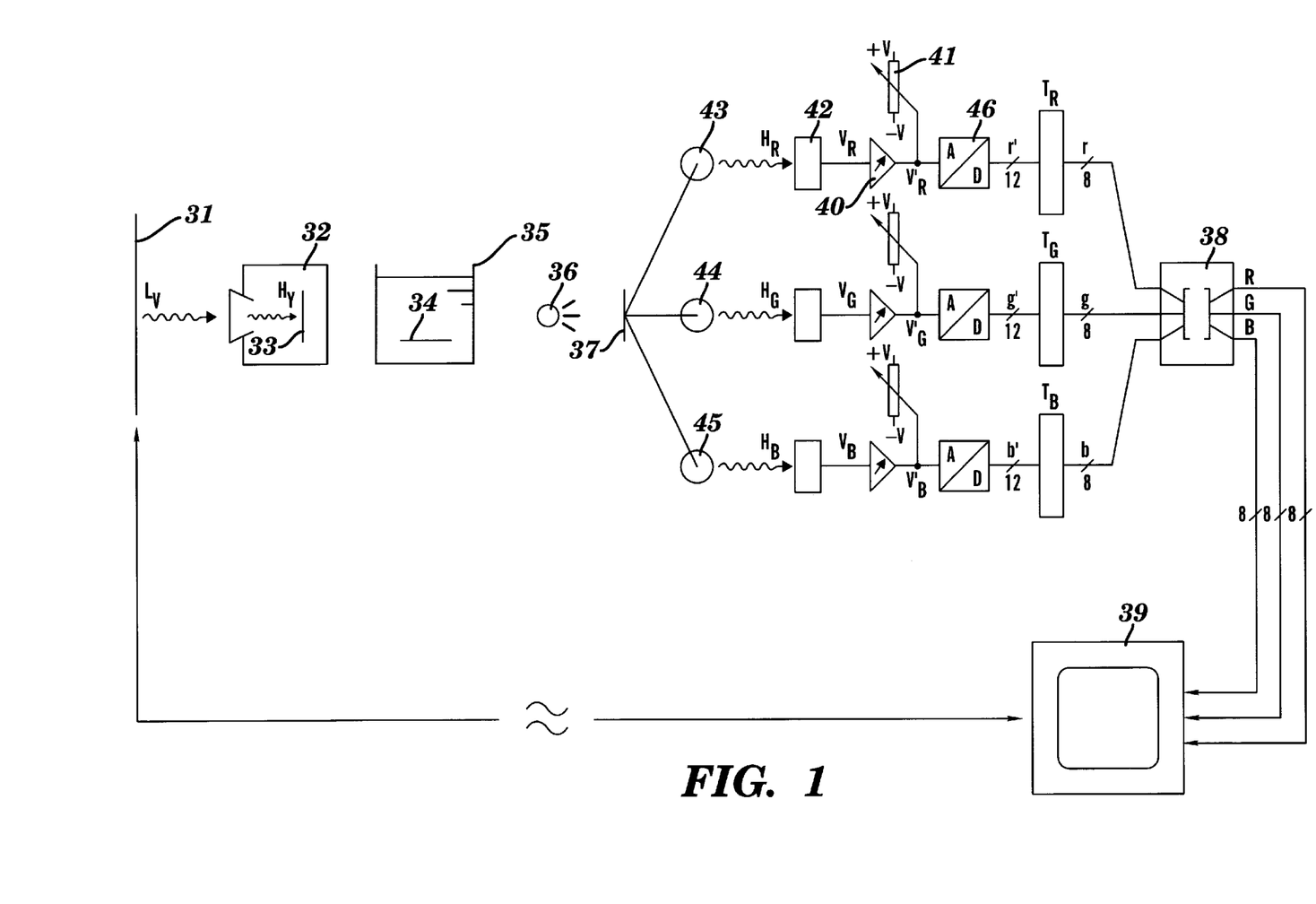
FIG. 1 is a diagrammatic representation of a photograph of a scene and the digitisation of the colour negative picture.

Referring to FIG. 1, a system is represented diagrammatically from the image acquisition to the display of digital signals on a video display unit 39. A scene 31 is lit by a given illuminant (not shown), usually by direct or diffused sunlight, in a trial arrangement by a calibrated illuminant. A camera 32 captures through a lens or lens unit part of the light $L_V$ diffusely reflected by scene 31 and converges the light-rays provided by a single point of the scene on the picture element thereof on a photographic carrier 33 situated in camera 32. The converged light exposes and excites, as a function of the wavelength range, the photosensitive coatings of carrier 33. A latent image is formed thereby. Next, photographic carrier 34 is fed into a processor 35, in which the latent image is developed. After processing the latent image is visually perceptible as a colour negative picture on photographic carrier 34. Thereupon, the carrier is exposed in the digitiser to lamp 36 emitting light with a broad spectrum. The light falls on transparent carrier 37 and is filtered by the dyes, which are forming the visually perceptible image. In an optical path the light modulated by the dyes is passed through three filters, respectively a red filter 43, a green filter 44 and a blue filter 45. The optical path of the light filtered by red filter 43 is described herein below, a similar description being applicable to the remaining image signals (green and blue). The red light, which is transmitted by this filter, reaches along an optical path an appropriate photosensitive member 42 and exhibits at that location a given illuminance $E_V$, expressed in lux (lx), further denoted by $E_R$ to specify that the red colour component is involved. For a short time the photosensitive member captures the light energy giving rise to a given exposure $H_V$. Again the subscript V is replaced by R, thus $H_R$. $H_R$ is directly depending on $E_R$. $E_R$ is depending on the spectral characteristics of the dyes on that part of the carrier that is transmitting the light. In addition, $H_R$ is depending on the exposure time or the integration time. The integration time is an important parameter of the digitising system, which allows an adjustment of the "sensitivity", the "dynamic range" or the "light amplification". Alternatively, the "sensitivity" of the digitising system may be enhanced by increasing the luminous intensity of the illuminant. The photosensitive member converts the exposure $H_R$ into a charge $Q_R$, which is proportional to $H_R$. By means of an electronic circuit charge $Q_R$ is converted into a voltage $V_R$, which is proportional to charge $Q_R$, and more convenient for electronic manipulation. Depending on the scanner type, voltage $V_R$ is subjected to a linear or non-linear transformation. The simplest and also linear transformation, which is represented diagrammatically in FIG. 1, is effected by means of a gain G 40 and a reference voltage $V_0$ 41. As a result, the voltage $V_R$ is converted in another voltage $V'_R$ that is within the specified voltage range of the ADC. ADC 46 converts the analogue voltage -signal into a digital signal r' with a fixed number of bits. In the state-of-the-art colour scanners that number of bits is at least eight, so that 256 equidistant levels of $V'_R$ can be differentiated. High-performance scanners for graphic art applications are currently equipped with an ADC generating twelve (as illustrated on the figure), thirteen or even sixteen bits for the colour value r'. If the ADC generates twelve or more bits a pixel, the adjustability of G and $V_0$ is generally not required, because a window may be selected digitally from the available levels later on. In the case of systems with an eight-bit ADC G and $V_0$ are usually adjustable, depending on the density range of the carrier to be scanned.

Currently, the image will be scanned twice, once during the pre-scan step and once during the final scan step. For a system, in which the ADC generates a sufficient number of bits, the broadest possible digital window is chosen during the pre-scan. The pre-scan is determining the size of the optimum window that is set during the final scan step.

For systems with gain G and reference voltage $V_0$ the latter two are set at the minimum value during the pre-scan step, so that neither the lowest nor the highest densities will make the ADC reach its saturated state, i.e. so that $V'_R$ both for points with a low density as for points with a high density will comply with the specified input voltage of the ADC. As will be explained herein below, the image signals obtained from the pre-scan determine the values of G and $V_0$, which are specific for the image.

The FOCUS COLOR (trademark of Agfa-Gevaert N.V.) scanner manufactured and distributed by Agfa-Gevaert N.V., Mortsel, is an eight-bit colour scanner, in which the exposure for the photosensitive member can be adjusted by adjusting the scanning speed, allowing thereby a modification of the integration time. The HORIZON (trademark of Agfa-Gevaert N.V.) scanner also a system manufactured and distributed by Agfa-Gevaert N.V., Mortsel, is a system with a nine-bit ADC, also provided with means for adjusting the carrier exposure and the integration time of the photosensitive members to the density range of the carrier.

The HORIZON PLUS, also a scan system of Agfa-Gevaert N.V. is equipped with a thirteen-bit ADC. The analogue path thereof is not provided with a control for adjusting the dynamic range. The window function thereof is effected by means of tone curves performing the transformations $T_R$, $T_G$ and $T_B$ as a result of which densities below the lowest in the image and above the highest are not further processed. In the ACS 100, a high-performance scanner for graphic art applications of Agfa-Gevaert N.V., is equipped with a thirteen-bit ADC and exhibits a variable integration time due to optical enlargements of the original image. The tone curve of said scanner accepts thirteen bit as input which is sufficient for the system's supplying an eight-bit corrected output signal r. However, it is also possible for the tone curves to transform the electrical colour values into more or less than eight bit.

The electrical red colour value r'—being obtained from the ADC—is converted by means of the tone curve $T_R$ into a digital (corrected) red colour value r. The way of proceeding and drafting the tone curve $T_R$ is described in further detail herein below. The tone curves for red, green and blue, convert the pixel values r', g' and b' of a digital representation of the negative picture into a digital representation of the positive picture with pixel values r, g and b.

Figure 2A:
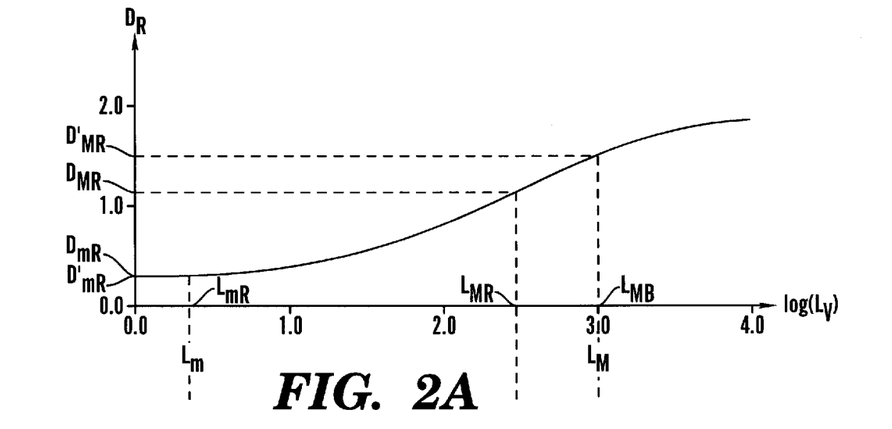
FIG. 2 represents the characteristic system curves for given types of film and scanner on which the subject brightness range can be estimated.
Figure 2B:
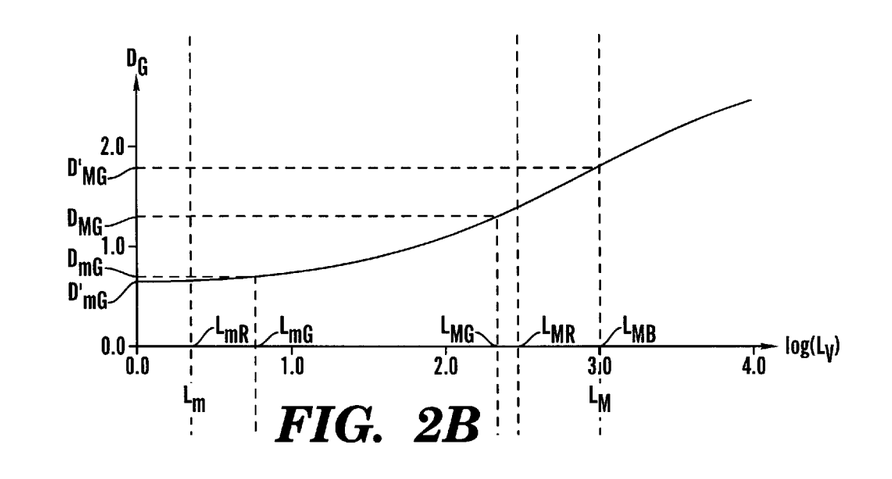
Figure 2C:
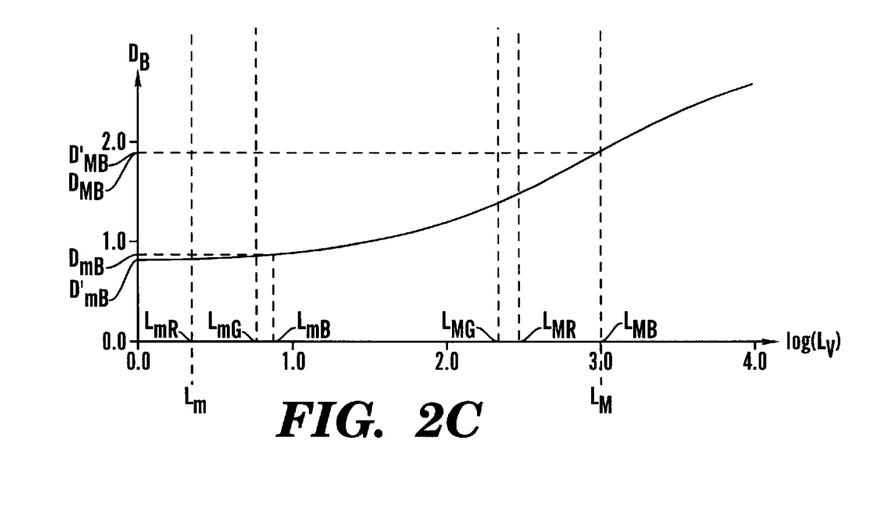

If the digital colour value g for green and colour value b for blue have been obtained in a similar way, the image signals are already suitable for the true-colour rendering of neutral tones in the scene as well as very suitable for supplying images that can be further manipulated in an interactive way for use in colour applications, such as PHOTOSHOP (trademark of Adobe Inc.). Furthermore, a correction of colour shifts resulting from the photographic process is usually required. This is achieved by combining the colour values r, g and b and calculating there from the colour-corrected colour values R, G and B in a colour transformation system 38. A colour video display unit 39 controlled in response to these R, G, B signals will reproduce an image that is, within the limits of the colour gamut of the display unit, a reproduction of true colour of the scene. Consequently, such images are very suitable as a base for reproducing reproductions of the original scene. Referring to FIG. 2, a description is given of the way of optimally selecting the settings of the analogue gain G and the reference voltage $V_0$ or of determining the limits for the digital window. A pre-scan step is intended for determining the density range of the image carrier. To that end, the scan should cover the full density range, which is varying between 0.0 D and 2.0 to 3.0 D, depending on the scanner performance. The HORIZON scanner as stated above has a dynamic range of 0–2.5 D, the ACS 100 of 0–3 D. Matched with the density range of the image to be digitised the dynamic range can be curtailed by adjusting the integration time for the photosensitive member, by setting a diaphragm in the optical path and by judiciously selecting the gain G in the analogue electrical path.

In order to determine the density range of the image to be digitised, for each of the colour components the minimum and maximum densities in the image have to be found. In the art the minimum density tones are called the highlights and the maximum density tones are called the shadows. They may be found by e.g. an interactive process or by analysing an histogram for each of the colour components.

The interactive process requires that the user marks the 'white point' in the scene. On the colour negative picture obtained from the pre-scan, it corresponds to the darkest point on the image. The user moves a mark on the screen to that point on the image and informs the system that the selected point is the 'white point'. As a result, the system can find which is the highest luminance in the scene that has to be represented.

For an automatic determination of the density range, e.g., a histogram is plotted based upon the electrical colour values of each of the colour components for all pixels. Next, the histogram is classified according to classes containing each approximately two per cent of the population, the first class corresponding to a low colour value or high density, the last class to a high colour value or low density. The lower limit of the first class determines the maximum density $D_M$, whereas the upper limit of the last class determines the minimum density $D_m$. By using the histogram procedure, random scan errors will be eliminated when determining the minimum and maximum colour densities. Alternatively, the effect of such scanning problems may be neutralised by using noise suppression procedures.

For the image signals derived from the red colour component the minimum density denoted on FIG. 2 by $D_{mR}$ and the maximum density $D_{MR}$ are obtained. The same applies to respectively $D_{mG}$ and $D_{MG}$ for the image signals derived from the green separation image and $D_{mB}$ and $D_{MB}$ derived from the blue separation image.

In scanners equipped with but an eight-bit ADC an optimum setting of the gain G and the reference voltage $V_0$ in the analogue circuit is advantageous so that an optimum use can be made of the digital capacity for the colour values for representing useful densities, i.e. densities that are actually found within the density range of the image to be digitised, avoiding thereby that colour values would be associated to densities that are not occurring in the image. Upon setting G and $V_0$ the occurrence of an unwanted colour shift should be avoided, which means that neutral tones in the scene would give rise to electrical colour values r', g' and b' that have a distinct value individually. Therefore, when setting G and $V_0$ for each of the channels, the colour signals of all three colour components have to be taken into account. They will determine for each of the colour channels separately a specific value for G and $V_0$. Furthermore, too high a setting for the gain G will have an adverse effect. Indeed, if the scanned image is obtained partly from a fully transparent area on, or next to the image carrier, some CCD elements may reach a supersaturated state and give rise to an effect known as blooming. As a result, neighbouring CCD elements will also reach a saturated state without apparent cause for such effect in the scanned image on that particular location.

The specific setting of G and $V_0$ is aiming at representing neutral tones in the scene by means of equal electrical colour values r', g' and b'. To that end, G and $V_0$ are determined for each of the colour components by using the corresponding characteristic system curves, the way of obtaining them will be described further herein below. G and $V_0$ are determined on the basis of the estimated subject brightness range ($L_m$, $L_M$) of the scene.

Referring to FIG. 2 the estimation of the subject brightness range is described in further detail. First, the density ranges ($D_{mR}$, $D_{MR}$), ($D_{mG}$, $D_{MG}$) and ($D_{mB}$, $D_{MB}$) of each of the colour components are plotted on the respective axes $D_R$, $D_G$ and $D_B$. Each of these density ranges corresponds to a subject brightness range respectively ($L_{mR}$, $L_{MR}$), ($L_{mG}$, $L_{MG}$) and ($L_{mB}$, $L_{MB}$). The widest subject brightness range ($L_m$, $L_M$) is determined there from by selecting the minimum $L_m = \min(L_{mR}, L_{mG}, L_{mB})$, respectively the maximum $L_M = \max(L_{MR}, L_{MG}, L_{MB})$, of the estimated subject brightness ranges of each colour component. The obtained global subject brightness range ($L_m$, $L_M$) is transferred to the y-axes $D_R$, $D_G$ and $D_B$ by using the characteristic system curves providing thereby for each of the colour components a corrected density range ($D'_{mR}$, $D'_{MR}$), ($D'_{mG}$, $D'_{MG}$) and ($D'_{mB} - D'_{MB}$). Each of the corrected density ranges determines for the colour component involved the gain G and the reference voltage $V_0$ defining the analogue voltage range for the ADC. In this way, it can be achieved that in, e.g., an eight-bit system a picture element of the darkest neutral point in the scene will be imaged on the pixel value (r', g', b')=(255, 255, 255) and the lightest neutral point will give rise to the pixel value (0, 0, 0). In case of a system with a digital window function, $r'_{mR}$ and $r'_{MR}$ corresponding to respectively $D'_{mR}$ and $D'_{mR}$ will be determined.

For each of the colour planes, i.e. the set of colour values for one single colour component on the image, a tone curve is determined respectively $T_R$, $T_G$ and $T_B$. Tone curve $T_R$ transforms the electrical colour value r' into a digital colour value r. In a similar way, g is derived from g' by means of $T_G$ and b from b' by means of $T_B$. The tone curves $T_R$, $T_G$ and $T_B$ are selected in a way that for all neutral tones in the scene not only the three digital colour values r, g and b have a common digital colour value k, i.e. k=r=g=b, but that there is also a linear relation between the luminance $L_V$ of a neutral tone in the scene and the corresponding common digital colour value k:

$$k = s \cdot L_V + t \quad (1)$$

The constants s and t can be calculated explicitly by substituting the boundary values $L_m$ and $L_M$ of the estimated subject brightness range and solving the so obtained system of linear equations. For an eight-bit system with a minimum value for k equal to 0 and a maximum value for k equal to 255 the following system is obtained:

$$s \cdot L_m + t = 0 \quad (1a)$$

$$s \cdot L_M + t = 255 \quad (1b)$$

Determining the tone curves can proceed as described below. By way of illustration the procedure for drafting a transformation table $T_R$ (look-up table or LUT) transforming the electrical colour value r' into the digital colour value r is explained. To that end, for every possible value r' the corresponding value r has to be determined. In most of the scanners, even those with non-adjustable G and $V_0$, there is between r' and the exposure $H_R$ on the photosensitive member for the red colour component a linear relation that is uniquely defined by the fixed values or set values of gain G and reference voltage $V_0$. Consequently, the equation for the exposure is as follows:

$$H_R = p \cdot r' + q \quad (2)$$

wherein p and q are defined by G and $V_0$. In the case of scanners in which a γ-correction is performed in the analogue circuit, i.e. a non-linear electronic amplification on the voltage signal $V_R$ resulting in $V'_R = V_{max} \star (V_R / V_{max})_\gamma$, the relation between $H_R$ and r' is also known by using a theoretic model of the electronic circuit or by measuring. On some scanners γ is adjustable depending on whether the original involved is reflective or transparent. If the original is reflective typically γ=1 is selected, if the original is transparent γ=1.5.

The relation between $H_R$ and r' being known, from every value of r' the corresponding value of $H_R$ can be calculated. Since the equation for $D_R$ is given by the expression $$D_R = C - \log(H_R) \quad (3)$$

$D_R$ can be determined immediately by substituting $H_R$ in the latter equation, since the arbitrary constant C has a scanner-specific fixed value. The characteristic system curve makes it possible to calculate from $D_R$ the luminance $L_V$ of a point with neutral tone in the scene that would give rise to a density $D_R$ in the red channel of the scanner. For the determination of $L_V$ the value of $D_R$ is plotted on the $D_R$-axis. Next, the path of a straight line parallel to the $L_V$-axis is followed towards the characteristic curve. From the point of intersection with the characteristic curve the path of a straight line parallel to the $D_R$-axis is followed towards the $L_V$-axis. On the point of intersection with the $L_V$-axis, the value of $\log(L_V)$ can be read. The value read is converted to $L_V$ by taking the antilogarithm. The so obtained value of $L_V$ is substituted in equation (1) and so are the values found for s and t by solving the linear system (1a, 1b). A value for the digital red colour value r is obtained, which is corresponding to the electrical red colour value r' that was initially used. If r is negative, because $L_V<L_m$, preferably a value r of r=0 is adopted. If $r>r_{max}$, because $L_V>L_M$, preferably a value r of $r=r_{max}$ is adopted. The latter two conditions implement the digital window function.

The steps for calculating r from r' are performed for each of the possible values of r'. Once a pair (r', r) has been calculated, the value calculated for r is stored on a memory location with index r' in the LUT defining $T_R$. By using a look up table, a fast conversion of the entire red colour plane is possible, because the electrical colour value r', generated by the ADC, can be utilised as an index in the LUT defining $T_R$ and the digital colour value r will result immediately from the indexing step.

The tone curve $T_R$ may be calculated in alternative ways by, e.g., determining a limited number of (r',r)-pairs and deriving the intermediate table values from the calculated pairs by means of linear interpolation or any form of approximation. If need be, the limited number of calculated pairs can be determined by taking an r-value and deriving an r'-value from it, which may be particularly useful, if an inversion of the characteristic curve causes difficulty.

The transformations $T_G$ and $T_B$ may be drafted according to a similar procedure as described for $T_R$.

The transformation need not be performed digitally. It is conceivable that it is performed by means of electronic circuits on analogue electrical colour values r', g' and b', whereupon an ADC immediately provides the digital colour values r, g and b that are linearly related to $L_V$.

It is furthermore possible that gain G or reference voltage $V_0$ can not be set at all, or can only be set with a G and $V_0$ equal for all colour components. That is usually the case on scanners of simple design or on scanners incorporating an ADC that transforms the analogue voltage signal to, e.g., twelve-, thirteen-, or sixteen-bit colour values r', g', b'. The linear relation as expressed in equation (2) still applies, p and q being fixed scanner parameters that, however, may be different for the three colour components. If such scanners perform any correction in the analogue circuit the relation between, e.g., r' and $H_R$ can still be determined theoretically or by measurement. Otherwise, the determination of tone curves $T_R$, $T_G$ and $T_B$ proceeds as described above. Rather than drafting the characteristic system curve $D_R=f(L_V)$ and using it for the determination of r and r', a graph may be drafted for $r'=g(L_V)$ for a fixed setting of the analogue circuit, particularly by setting fixed values for gain G and reference voltage $V_0$. $L_V$ is then obtained directly by inverse evaluation of the function g in r', the further procedure being similar to the above description. The digital pixel values r, g, b are a faithful reproduction of the luminance of points of a neutral colour in the scene. Due to the fact that colour couplers or masking compounds may be incorporated into colour negatives, pixel values representing a coloured point in the scene can still contain substantial colour shifts. It has been found that the colour shifts for commercially available films are linear and additive in the $\log(L_V)$-space, which means that in that space there is a linear transformation, e.g. characterised by a 3×3 matrix with constant coefficients, that is compensating for the colour shifts. If the behaviour of the colour shifts would deviate from the illustrated linear model, the colour shifts can be characterised by a more complicated, non-linear model incorporating e.g. cross products with constant coefficients. The benefit of the linear approximation resides in the fact that determining the coefficients is simpler and that less calculating steps are required when implementing the transformation.

The determination of the coefficients of the above-mentioned matrix will be explained further herein below.

First, the conversion of electrical colour values r', g', b' into digital colour values r, g, b and their further transformation into colour-corrected colour values R, G, B will be described. The separate tone curves $T_R$, $T_G$, $T_B$ are determined in a similar way as explained above. However, rather than calculating the value of $L_V$ from $\log(L_V)$ by taking the antilogarithm, it is advantageous to transform $\log(L_V)$ linearly to the digital colour value, e.g. r. An optimum use of the available digital capacity, e.g. 256 values in case of an eight-bit digital colour value, can be provided by imaging $\log(L_m)$ on 0 and $\log(L_M)$ on 255. The equations 1, 1a and 1b remain valid, if $L_x$ is substituted by $\log(L_x)$ in each equation. The advantage of this procedure consists in avoiding an adverse effect called posterisation. Posterisation, also called landscaping or false contouring, occurs when small colour shifts on the original give rise to markedly visible colour shifts in the reproduction, particularly if such effect is found in large areas of almost constant colour. This may be due to a restriction of the number of colour values, e.g. in four- or six-bit systems, or to an inexpert allocation of colour values to densities. Posterisation may also occur, if a number of colour values are no longer found in a colour plane as a result of some manipulations, and the histogram of a colour plane shows as it were gaps. Separations having colour values near such gap are often exhibiting posterisation. A manipulation that may give rise to posterisation is the transformation of an eight-bit signal to an eight-bit signal, the signals being interrelated according to a logarithmic relation. The logarithmic transformation is included in the tone curve for reducing the risk of posterisation. As stated before, tone curve $T_R$ transforms a colour value r' into a colour value r that has a linear relation to $\log(L_V)$ for neutral tones in the scene. A similar statement applies to $T_G$ and $T_B$. Next, the digital pixel values r, g, b can be transformed to colour-corrected pixel values respectively R', G' and B' in the $\log(L_V)$-space by means of the above-mentioned transformation matrix and that as follows:

$R'=M_{Rr}\cdot r+M_{Rg}\cdot g+M_{Rb}\cdot b+R_0$
$G'=M_{Gr}\cdot r+M_{Gg}\cdot g+M_{Gb}\cdot b+G_0$
$B'=M_{Br}\cdot r+M_{Bg}\cdot g+M_{Bb}\cdot b+B_0$ Matrix $M_{Cc}$ together with the vector $R_0$, $G_0$, $B_0$ is further called the colour transformation matrix. Vector $R_0$, $G_0$, $B_0$ is a set of constants that is introduced, because, except for a constant, r, g and b are proportional to $\log(L_V)$ and the result R', G' and B' should meet a given digital capacity (e.g. 0,255) as close as possible.

The so obtained colour-corrected colour values in the $\log(L_V)$-space respectively R', G' and B' are then separately subjected to an exponentiation, so that R, G and B values are obtained that, except for a constant, are proportional to $L_V$ for neutral tones in the scene. Considering the transformation from R' to R, the expression is as follows:

$$R=v\cdot 10^{R'}+w \qquad (4)$$

Constants v and w are selected again in a way that an optimum use is made of the digital capacity for R, G and B. Consequently, a grey swatch in the scene with luminance $L_m$ gives rise to (R, G, B)=(0, 0, 0) and a grey swatch with luminance $L_M$ gives rise to (R, G, B)=(255, 255, 255).

After the colour transformation (r, g, b)→(R, G, B) the relation R=G=B still remains valid for points with neutral tones in the scene, although the relative proportions between the red, green and blue colour values may have changed for points in the scene with colour tones differing from grey.

The way of obtaining the characteristic system curves and of calculating the coefficients of the transformation matrix will now be described further in detail.

One way of determining the characteristic system curves consists in starting from the characteristic film curve of the negative material. The exposure of the negative material $H_V$ on the x-axis of the film curve is proportional to the luminance of the imaged point of the scene $L_V$ on the x-axis of the system curve. The proportionality factor is defined by the exposure of the scene, the distance between camera and scene, the optical path in the camera and to a considerable extent by the shutter time of the camera. This proportionality constant can be selected arbitrarily, since it will be eliminated by the linear transformations optimising the use of the digital capacity. Furthermore, the optical density on the y-axis of the characteristic film curve and the colour density of each of the colour components on the y-axis of the characteristic system curve are apparently almost equal and upon initial approximation they differ but by an additive constant. This constant which is defined by the exposure characteristics of the scanner and the colour filters used is calculated preferably as follows. The characteristic film curve exhibits on its y-axis a minimum called the optical density at fog level $D_{fog}$, i.e. the optical density measured on a strip of unexposed processed film. As the value measured may vary for all three colour components, distinction is made between $D_{fogR}$, $D_{fogG}$ and $D_{fogB}$. On a strip of unexposed processed film, e.g. on the area between two recordings, the colour densities $D_{fR}$, $D_{fG}$ and $D_{fB}$ can be measured by means of the scanner. The difference $D_{fogR}-D_{fR}$ will determine to which extent the characteristic film curve has to be shifted downwards, in order to be an approximation of the characteristic system curve. If the film curve is given in tabular form, every density value can be decreased by the difference as stated above. In this way, a characteristic system curve suitable for the process of the present invention may be obtained from the characteristic film curve. The determination of the optical density at fog level in each of the colour components can be effected on the occasion of the pre-scan. The actual digitisation of the colour negative picture is thus preceded by a short calibrating step determining the optimum scanner settings (gain G and reference voltage $V_0$ or digital window function based on the density range and derived subject brightness range) as well as the optical densities at fog level.

A second way of approximating the characteristic system curve is based on the assumption that this curve is linear within the operating window and has a slope respectively $\gamma_R$, $\gamma_G$ or $\gamma_B$ for the red, green and blue colour components. Furthermore, the curves pass through the point of origin of the rectangular axes $\log(L_V)$ and $D_X$. The benefit of this alternative method resides in the fact that only the three γ-values of the colour negative material have to be available. They can be provided by the manufacturer of the photographic material. There is no need for having the disposal of a full characteristic curve in graphic form or in tabular form, nor for measuring the optical densities at fog level. In addition, a linear function is easy to evaluate and to invert.

A third way of determining the characteristic system curve is not making explicit use of the characteristic film curve, but is rather based on a purposeful measurement of the film material by means of the scanner type that will be used for the digitisation of the colour negative pictures. In a standardised environment a test target is photographed on the negative material to be characterised. The latent image is developed and the obtained developed colour negative picture is scanned on the scanner to be characterised. For a number of points on the negative image, with a neutral tone in the scene, the luminance $L_V$ in the scene and the exposures $H_R$, $H_G$ and $H_B$ on the photosensitive members for all three colour components are determined. Preferably, this is achieved in the way described below. An IT8.7/2 reflective colour reference target is exposed to a lamp with a colour temperature of 5000 K. The IT8.7/2 reference target is a colour image defined by IT8 SC4, i.e. Subcommittee 4 (Color) of ANSI Committee IT8 (Digital Data Exchange Standards). It is particularly suitable for reflective image carriers. The full reference target is composed of separate swatches, each of a distinct grey or colour tone. The tones of the target swatches are selected in a way that together they constitute a proper representation of the colour space or colour gamut that may be realised on the opaque carrier for the reference target. The reference target further contains among others a grey-wedge consisting of separate grey swatches, the densities of which are recommended by the Standardisation Committee and are accurately determined for each separate IT8.7/2 copy by measurement on a densitometer. The reference target is photographed by a camera containing the negative film material. The diaphragm and the distance to the scene, formed by the reference target, are kept constant. Consecutive recordings are made from the reference target, each with a different shutter time. If the latter doubles, the exposure on the negative material will double as well. By using this process, the subject brightness range of the reference target can be virtually extended. The film is developed and the image corresponding to a single selected standard shutter time is digitised by the scanner. For each of the grey swatches an electrical value r', g' or b', taking the average of the swatch, is obtained in every colour component. This electrical value can be converted into an exposure $H_R$, $H_G$, $H_B$ on the photosensitive member. The negative logarithm of this exposure, e.g. $D_R$ for the red separation image, is plotted on the y-axis, and the logarithm of the luminance $\log(L_V)$ of the corresponding grey swatch in the scene on the x-axis. In this way, a number of measured points are obtained on the graph. The number of measured points can be increased by digitising also the image obtained with a doubled shutter time. In that case, a luminance that is two times as high as the luminance at the standard shutter time is allocated to the grey swatch in the scene. A similar process can be applied, if need be, at half a shutter time and still further shutter times. The obtained discrete measured points are insufficient for evaluating the characteristic system curve in the points required for drafting the tone curves. Therefore, from these discrete measured points a continuous function is derived that is defining the characteristic system curve throughout the subject brightness range. The most obvious method consists in a linear interpolation between every two consecutive measured points. The characteristic system curve so obtained is a broken line. In practice, it became apparent that heavy salient points in the curve give rise to an irregular course of the tone curves, which for its part may result in posterisation, as described above. An interpolation method that is free of salient points is cubic (spline) interpolation. In the measured points, apart from the regular continuity, also the first and second derivatives are continuous, which results in the absence of salient points. According to this method, however, if the measured points are irregularly distributed, e.g. due to measuring errors, the curve joining the measured points will show an incorrect course. The curve should indeed be strictly ascending and the slope should not vary too substantially. For the above-stated reasons interpolation is abandoned and preferably any approximation method is applied which is averaging out measuring errors as well. One method of approximation is a least-squares approximation with a cubic spline function having a reduced number of internal nodes. Another method of approximation is expressed by the following equation:

$$D = \frac{D_{\min} + D_{\max} \times 10^{a \log L_V - b}}{1 + 10^{a \log L_V - b}} \quad (5)$$

For each of the colour components the four parameters respectively $D_{min}$, $D_{max}$, a and b are defined in a way that the measured points are the nearest possible to the curve. The curves illustrated in FIG. 2 have been drafted according to this approximation method by means of measuring data. The parameters found according to this approximation method are listed below: for red: $D_{min}$=0.271, $D_{max}$=2.003, a=0.699, b=1.721; for green: $D_{min}$=0.581, $D_{max}$=2.963, a=0.576, b=1.704; for blue: $D_{min}$=0.799, $D_{max}$=2.946, a=0.666, b=1.988.

The benefits of the latter approximation function reside in the fact that it is simple to invert, provides a value for $D_{min}$, which is corresponding to $D_{fog}$, and is properly describing the theoretic model of the characteristic system curve. Several methods have been disclosed for calculating the parameters from the measured points, such as e.g. in Press William H. et al., "Numerical Recipes in C", 2nd Edition, Cambridge University Press, 1992, pp. 683–688. A typical characteristic of this basic function is that its graph is S-shaped, i.e. it is always ascending throughout the defined interval and tends to an horizontal course at the endpoints of this interval. A number of such basic functions is disclosed by Oldrich Pytela and Jaroslav Majer, "Quantitative Interpretation of Sensitometric Curves of Photographic Materials", Journal of Imaging Science, Volume 35, Number 6, November/December 1991, p. 362.

In practice, it became apparent that the characteristic system curves differ film batch by film batch, even if batches of the same film type are considered. This can be due to speed fluctuations of the film material resulting from the manufacturing process, the film ageing and the processing conditions. It is essential taking these batch variations into account, when scanning negative pictures. However, it appeared that characteristic system curves of two distinct batches of the same film type blend one into the other, when vertically shifted through the proper distance one with respect to the other. If the above-described measurements for determining the characteristic system curve are performed on a reference film, selected from a random batch of the same film type, generic characteristic system curves can be drafted, generic being denoted by the subscript g. Moreover, the generic (subscript g) densities at fog (subscript f) level $D_{fRg}$, $D_{fGg}$ and $D_{fBg}$ respectively for the red (R), green (G) and blue (B) colour components are measured on this reference film by means of digitisation on the scanner. The characteristic system curve for any other film of the same type is obtained as described below. First, the densities at fog level $D_{fR}$, $D_{fG}$ and $D_{fB}$ are measured on the unexposed area between two picture recordings on the developed film by means of digitisation on the selected scanner. Next, the system curves $D_R$, $D_G$ and $D_B$ as a function of log($L_V$) are derived from the generic system curves $D_{Rg}$, $D_{Gg}$ and $D_{Bg}$ by implementing following equations:

$D_R = D_{Rg} + D_{fR} - D_{fRg}$ $D_G = D_{Gg} + D_{fG} - D_{fGg}$ $D_B = D_{Bg} + D_{fB} - D_{fBg}$ \quad (6)

The relations stated above provide the characteristic system curves to be used for the determination of the tone curves $T_R$, $T_G$ and $T_B$ as already described above.

The previous methods are valid for different batches of film from the same film type and scanned on the same scanning system, where the characteristic system curve per colour component for the batch can be obtained by shifting a corresponding generic characteristic film curve over a vertical distance. More precise measurements have shown that for each individual characteristic system curve also a specific horizontal shift of the curve may be necessary. This shift is preferentially done in the (log($L_V$), $D_C$) domain, where $L_V$ stands for the luminance and $D_C$ the density measured by the specific scanner for component C, where C can be e.g. red, green or blue. As discussed above, the vertical shift is dictated by the fog-density of the film. The amount of horizontal shift for each colour component is preferentially established by the requirement that a neutral point in the original image must give equal digital colour values r=g=b. This can be done as follows. First of all, three preliminary characteristic curves $D_R$, $D_G$, $D_B$ as a function of log($L_V$) are established, by shifting the generic characteristic curves over a vertical distance, obtained from the fog density. An operator then selects interactively a point on the digitised image that represents a neutral point from the original image. This could be for example the most white point in the original image. The electrical colour values for the indicated point are registered. According to the characteristics of the scanning system, the corresponding density values $D_R$, $D_G$ and $D_B$ are derived. Via the preliminary characteristic curves, a log($L_V$) value is obtained for $D_R$, $D_G$ and $D_B$ by inverse evaluation. If the three preliminary. characteristic curve were positioned correctly, the log($L_V$) value would be the same for these three inverse evaluations. Practically, these values are different, and can be indicated by log($L_{VR}$), log($L_{VG}$) and log($L_{VB}$). One can fix a required log($L_{VF}$) value for these three findings, by taking one of the three values, taking the mean or median value or an estimated correct value. Once this value established, the three preliminary characteristic system curves $P_R'$ $P_G$, $P_B$ represented by the following equations:

$D_R = P_R (\log(L_V))$ $D_G = P_G (\log(L_V))$ $D_B = P_B (\log(L_V))$ are transformed to the effective characteristic system curves $E_R$, $E_G$, $E_B$ by the transformation:

$D_R = E_R (\log(L_V)) = P_R (\log(L_V) + \log(L_{VR}) - \log(L_{VF}))$ $D_G = E_G (\log(L_V)) = P_G (\log(L_V) + \log(L_{VG}) - \log(L_{VF}))$ $D_B = E_B (\log(L_V)) = P_B (\log(L_V) + \log(L_{VB}) - \log(L_{VF}))$ By inverse evaluation of the effective characteristic system curves $E_R$, $E_G$, $E_B$, the densities $D_R$, $D_G$ and $D_B$ of the "white point" will be transformed to the same fixed log($L_{VF}$) value.

If the scanning system has a restricted density range, such as the Arcus II scanner, marketed by Agfa-Gevaert N.V. which scans correctly a maximum density value of 1.9, it is not advantageous to pick the most white point from the original image to establish the parameters for this horizontal shift operation. The most white point will give the highest possible density obtainable by the specific scanner for each colour component, which can be significantly different for the different colour components. If the shift parameters would be based on the measurement of a "white point" that cannot be scanned accurately, this would yield a bad transformation result for points having a density that is scanned accurately. Therefore, it is preferred to select a "white" point having a neutral colour, for which the densities are slightly below the maximum possible densities. This yields the required results. Once the effective characteristic curves are identified, the luminance range can be identified and all other colour processing steps as described above can be done to get a colour corrected image. If the highest density of every colour component on the negative colour image is lower than the maximum density reached by the scanner, the $L_M$ value will be determined by the point in the original image having the highest luminance. If the maximum density of the colour components cannot be scanned correctly by the scanning system, the luminances corresponding to the maximum achievable densities in each colour component will determine the $L_M$ value. The process for obtaining this $L_M$ value remains the same for both high end and low end scanners.

If colour-corrected colour values are required after digitisation, it is furthermore necessary to determine the twelve coefficients of the transformation matrix described above. To that end, the following procedure is preferentially followed. As already described, an IT8.7/2 reference target is photographed under standard conditions, exposing thereby the selected type of colour negative material. After development, the negative picture is scanned entirely. The generic characteristic system curve is determined in the above-mentioned way, and from that curve the three tone curves $T_R$, $T_G$ and $T_B$ are calculated. As more previously described, by transforming the electrical colour values r', g' and b' by means of the corresponding tone curves the digital colour values r, g and b are determined for every pixel on the picture. The colour values r, g and b are a linear function of $L_V$ for the neutral tones in the scene.

On the other hand, the IT8.7/2 reference target is also measured colorimetrically. Of every reference swatch the tristimulus value in a colour space for a given type of display unit is determined and the three co-ordinates are re-scaled for optimum use of a given digital capacity, e.g. into 256 numerical values in an eight-bit system. The re-scaled tristimulus values denoted by A, B and C represent the target values for the colour-corrected values R, G and B. Consequently, the matrix transformation has to be determined in a way that the colour-corrected pixel values R, G and B are approximating the re-scaled tristimulus values A, B and C of the corresponding colour swatch as close as possible. Calculating the matrix elements $M_{Cc}$ and the vector elements $R_0$, $G_0$ and $B_0$ is effected by solving an over-determined system of non-linear equations according to the method of least squares in the intensity domain A, B, C. The equations constituting the system are found by listing the colour swatches that are intentionally to be taken into account. This list preferably includes all reference swatches with a neutral colour. Also reference swatches in the scene having a cyan, yellow and magenta colour with several colour saturation levels are preferably considered. The digital pixel values r, g and b and the re-scaled tristimulus values A, B and C of the listed colour swatches are determined. The digital colour values r, g and b are transformed into the $log(L_V)$-space as described above. As a result, r", g" and b" are obtained. By proceeding in the same way for the values A, B and C, A", B" and C" are obtained. For each of the colour swatches the values of r", g", b", A", B" and C" are substituted in the three equations, so that for every colour swatch three additional equations are obtained for the over-determined system. The number of colour swatches being greater than four, the number of equations obtained is exceeding the number of unknowns. The problem is solved by means of conventional approximation methods such as described in the previously quoted publication "Numerical Recipes in C". In this way, the coefficients required for the colour transformation matrix are obtained.

In practice, it became apparent that these matrix coefficients are only strongly depending on the film type in which other colour masks or colour couplers have been used, but are but slightly different for negative material of distinct batches of the same film type. The coefficients of the colour transformation matrix can thus universally be applied to one particular type of negative film material combined with one particular type of scanner. For every combination of film type and scanner a new set of coefficients has to be determined, preferably according to the method described above.

From the above it will be clear that it is essential to determine the following relations for every film type and for every scanner:

the generic characteristic system curves and the corresponding fog values, and the coefficients of the colour transformation matrix.

The digital colour values are obtained by transforming the electrical colour values of each of the colour planes by means of a single tone curve obtained from the characteristic system curve for the corresponding colour component. The characteristic system curve is specific for a batch of negative material and is derived from the generic characteristic system curve of a reference film of the same film type by matching the densities at fog level of the reference film and of the film to be digitised.

The colour-corrected pixel values are obtained by transforming the digital pixel values into the $log(L_V)$-domain, implementing on these pixel values a colour transformation matrix with constant coefficients, and performing an exponentiation on the so obtained values. The coefficients for the colour transformation matrix have to be determined on the selected scanner for a single reference film of the same film type.

Whenever another scanner system is changed-over to, the characterisation steps, i.e. determination of the generic system curves and determination of the transformation matrix, have to be performed again.

Although the present invention has been described with reference to preferred embodiments, it will be clear to those skilled in the art that changes in design and details may be introduced without deviating from the intention and the scope of the invention.

What is claimed is:

1. A method for generating digital colour values representing a test target from a colour negative image of the test target, recorded onto an image carrier, said test target including at least one grey swatch, comprising the following steps:

scanning said colour negative image with a colour image scanner;

separating the colour negative image into a plurality of colour components;

converting each colour component into a plurality of electrical colour values, each colour value representing a portion of the colour negative image;

establishing a relation between the plurality of electrical colour values of each colour component and a luminance of the at least one grey swatch; and, transforming said plurality of electrical colour values into a plurality of corresponding digital colour values according to said relation, said transforming step being done independently by one tone curve per colour component, derived from said relation; and, wherein the drafting of the tone curve for each of the colour components comprises the steps of:

estimating the global brightness range of the test target as represented by the colour negative image;

determining for every electrical colour value the corresponding luminance of the at least one grey swatch;

associating to every electrical colour value a digital colour value to which is assigned;

a minimum value if the corresponding luminance is lower than the lowest luminance in the global subject brightness range;

a maximum value if the corresponding luminance is higher than the highest luminance in the global subject brightness range; and     a value between the minimum and maximum values that is in a linear relation to the corresponding luminance if said luminance is lying within the global subject brightness range.

2. A method according to claim 1, wherein the estimation of the global subject brightness range of the test target comprises the steps of:

digitising the colour negative image;

determining the density range of each of the colour components;

determining the subject brightness range of each of the colour components from the determined density range of each of the colour components; and     determining the global subject brightness range as the union of each of the subject brightness ranges of each of the colour components.

3. The method according to claim 1, wherein determining the luminance of the grey swatch from the electrical colour value comprises the steps of:

determining a colour density that is corresponding to the electrical colour value; and     determining the luminance of the grey swatch that is corresponding to the colour density.

4. The method according to claim 3, wherein determining the luminance of the grey swatch recorded from the original scene that is corresponding to the colour density comprises the steps of:

plotting the colour density on the density axis of a characteristic system curve related to the colour component; and     determining the luminance by inverse evaluation of the characteristic system curve in the colour density plotted.

5. The method according to claim 4, wherein drafting the characteristic system curve related to a colour component c of the colour scanner for a sample of colour negative material included in a type of colour negative material comprises the steps of:

selecting a reference sample of the type of colour negative material;

drafting the generic characteristic system curve $D_{cg}(L_V)$ for the colour component c of the colour scanner for the reference sample;

measuring the generic density at fog level $D_{cfg}$ in the colour component c by means of the colour scanner on the reference sample;

measuring the density at fog level $D_{cf}$ in the colour component c by means of the colour scanner on the sample; and     determining the characteristic system curve $D_c(L_V)$ for the sample in a way that it satisfies the following equation:

$$D_c(L_V)=D_{cg}(L_V)+D_{cf}-D_{cfg}.$$

6. The method according to claim 5, wherein measuring the densities at fog level $D_{cf}$ and $D_{cfg}$ in the colour component c comprises the steps of:

digitising the image carrier, inclusive of unexposed areas, by means of the colour scanner;

converting the colour component of the image of an unexposed area into an electrical colour value; and     determining the colour density that corresponds to the electrical colour value.

7. The method according to claim 5, wherein drafting the generic characteristic system curve related to a colour component of the colour scanner for an image carrier of a type of colour negative material comprises the steps of:

determining the gradation γ of the colour negative material for each of the colour components;

defining the characteristic curve as a straight line having as slope the determined gradation and that is, in addition, intersecting the y-axis on the point of the generic density at fog level.

8. The method according to claim 5, wherein drafting the generic characteristic system curve related to a colour component of the colour scanner for an image carrier of a type of colour negative material comprises the steps of:

determining the characteristic film curve $D_{cm}$ of the colour negative material for each of the colour components;

reading-off the density at fog level $D_{cfog}$ in the colour component c from the characteristic film curve as the lowest density on said curve;

measuring the density at fog level $D_{cf}$ in colour component c by means of the colour scanner on the sample; and     determining the characteristic system curve $D_c$ for the sample in a way that it satisfies the equation:

$$D_c=D_{cm}+D_{cf}-D_{cfog}.$$

9. The method according to claim 5, wherein drafting the generic characteristic system curve related to a colour component of a colour scanner for an image carrier of a type of colour negative material comprises the steps of:

(1) selecting a scene comprising a number of grey swatches;

(2) photographically recording the colour negative image of the scene on the image carrier;

(3) determining the luminance $L_V$ of a grey swatch in the scene;

(4) converting the colour component of the colour negative image of the grey swatch into an electrical colour value by means of the colour scanner;

(5) determining the colour density $D_c$ that corresponds to the electrical colour value;

(6) defining a measured point as being the luminance $L_V$ and the colour density $D_c$;

(7) repeating steps (3) to (6) for all grey swatches in the scene; and (8) determining a continuous function $D_c(L_V)$ based upon the measured points obtained in step (7).

10. The method according to claim 9, wherein the selected scene is an IT8.7/2 under standardised exposure conditions.

11. The method according to claim 10, wherein the exposure of the scene is effected by means of an illuminant having a colour temperature of 5000 K.

12. The method according to claim 9, wherein the number of measured points is extended by increasing and/or decreasing the photographic exposure time of the image carrier.

13. The method according to claim 9, wherein the continuous function $D_c(L_V)$ is obtained by an approximation of the measured points by using an S-shaped basic function having less than five parameters.

14. The method according to claim 13, wherein the basic function is given by:

$$D = \frac{D_{\min} + D_{\max} \times 10^{a\log L_V - b}}{1 + 10^{a\log L_V - b}}$$

wherein $D_{min}$, $D_{max}$, a and b represent the parameters and said parameters are determined by using the measured points.

15. A method for generating digital colour values representing a test target from a colour negative image of the test target, recorded onto an image carrier, the test target including at least one grey swatch, comprising the following steps:
   scanning said colour negative image with a colour image scanner;
   separating the colour negative image into a plurality of colour components;
   converting each colour component into a plurality of electrical colour values, each colour value representing a portion of the colour negative image;
   establishing a relation between the plurality of electrical colour values of each colour component and a luminance of the at least one grey swatch; and,
   transforming said plurality of electrical colour values into a plurality of corresponding digital colour values according to said relation,
said transforming step being done by a tonal correction step followed by colour correction step, wherein the tonal correction step further comprises the steps of:
   drafting a tone curve for each of the colour components; and,
   converting every electrical colour value separately and independently of the remaining colour components into a digital colour value by means of the tone curve for each of the colour components;
wherein drafting the tone cure for each of the colour components comprises the steps of:
   establishing a global subject brightness range of the test target of which the colour negative image is a representation;
   determining for every electrical colour value the corresponding luminance of the grey swatch in the test target; and,
   associating to every electrical colour value a digital colour value to which is assigned:
      a minimum value if the corresponding luminance is lower than the lowest luminance in the global subject brightness range;
      a maximum value if the corresponding luminance is higher than the highest luminance in the global subject brightness range; and,
      a value between the minimum and maximum values that is in a linear relation to the logarithm of the corresponding luminance if said luminance is lying within the global subject brightness range.

16. A method for generating digital colour values representing a test target from a colour negative image of the test target, recorded onto an image carrier, the test target including at least one grey swatch, comprising the following steps:
   scanning said colour negative image with a colour image scanner;
   separating the colour negative image into a plurality of colour components;
   converting each colour component into a plurality of electrical colour values, each colour value representing a portion of the colour negative image;
   establishing a relation between the plurality of electrical colour values of each colour component and a luminance of the at least one grey swatch; and,
   transforming said plurality of electrical colour values into a plurality of corresponding digital colour values according to said relation;
said transforming step being done by a tonal correction step followed by colour correction step, wherein the colour correction step further comprises the steps of:
   acquiring the digital colour signals of one single pixel; and,
   transforming the digital colour signals into colour corrected signals;
   by means of a transformation model depending on parameters that are determined by:
      (1) selecting a scene comprising a number of grey and colored color swatches;
      (2) photographically recording the color negative image of the scene on the image carrier;
      (3) determining tristimulus values of a color swatch in the scene;
      (4) converting every color component of the color negative picture of the color swatch into an electrical color value by means of the color scanner;
      (5) converting the electrical color values into digital color values according to said relation;
      (6) defining a measured point as being the tristimulus values and an exponential transformation implemented on the digital color values;
      (7) repeating steps (3) to (6) for all color swatches in the scene; and
      (8) determining the parameters from minimizing a sum of deviations between the tristimulus values and the exponentially transformed digital color values throughout all measured points obtained in step (7).

17. The method according to claim 16, wherein the transformation model consists of a linear transformation with constant coefficients and additive constants.

18. The method according to claim 16, wherein the selected scene is an IT8.7/2 exposed to an illuminant having a colour temperature of 5000 K.

19. A method for generating digital colour values representing a test target from a colour negative image of the test target, recorded onto an image carrier, the test target including at least one grey swatch, comprising the following steps:
   scanning said colour negative image with a colour image scanner;
   separating the colour negative image into a plurality of colour components;
   converting each colour component into a plurality of electrical colour values, each colour value representing a portion of the colour negative image;
   establishing a relation between the plurality of electrical colour values of each colour component and a luminance of the at least one grey swatch; and, transforming said plurality of electrical colour values into a plurality of corresponding digital colour values according to said relation, said transforming step being done independently by one tone curve per colour component, wherein each tone curve is obtained from a genaric characteristic curve shifted over a vertical distance and a horizontal distance; wherein said horizontal distance depends on the electrical signals corresponding to the grey swatch.

20. A method for generating digital colour values, suitable for rendering an original image, comprising the following steps:

recording the original image as a colour negative image having substantially complementary colours with respect to the original image;

scanning said colour negative image to provide a plurality of electrical colour values for each of a plurality of colour components of said colour negative image;

establishing for each of said plurality of electrical colour values a linear relation between a luminance of a portion of said colour negative image and the corresponding electrical colour value over the global brightness range of the colour negative image; and, transforming said plurality of electrical colour values into a plurality of digital colour values according to said relation wherein said original image includes at least one neutral colour swatch and wherein said linear relation comprises a linear relationship between the luminance of said neutral colour swatch and each of said electrical colour values, corresponding to said at least one neutral colour swatch, such that electrical colour values corresponding to said at least one neutral colour swatch and representing different colour components are substantially identical.

21. A method for generating digital colour values, suitable for rendering an original image, comprising the following steps:

recording the original image as a colour negative image having substantially complementary colours with respect to the original image;

scanning said colour negative image on a scanner to provide a plurality of electrical colour values for each of a plurality of colour components of said colour negative image;

establishing for each of said plurality of electrical colour values a linear relation between a luminance of a portion of said colour negative image and the corresponding electrical colour value, over the global brightness range of the colour negative image; and, transforming said plurality of electrical colour values into a plurality of digital colour values according to said relation wherein said scanner includes a photosensitive element and wherein the step of establishing a relation between a luminance of a portion of said colour negative image and the corresponding electrical colour value, further comprises the steps of:

determining for each corresponding electrical colour value a corresponding colour expose level of the photosensitive element;

determining for each of said corresponding colour expose level of the photosensitive element, a corresponding colour density of the portion of the colour negative image, and, determining from each of said corresponding colour densities a corresponding luminance of the portion of the colour negative image;

wherein said portion of the colour negative image is a neutral colour swatch and further wherein the step of establishing the linear relation between the luminance of the portion of the colour negative and the corresponding electrical colour values representing different colour components includes representing different colour components with substantially identical corresponding electrical colour values.

22. A method for generating corrected colour values, suitable for rendering an original image, comprising the following steps:

scanning a colour negative image, representing the original image, to provide a plurality of electrical colour values, said plurality of electrical colour values representing a plurality of colour components of said colour negative image;

determining from said plurality of electrical colour values a density range vs a subject brightness range for each of said plurality of colour components;

determining a global brightness range as the union of each of the subject brightness ranges of said plurality of colour components;

establishing a corrected density range for each of said plurality of colour values in accordance with said global subject brightness range; and generating a plurality of tone curves, one for each of said plurality of colour components, for providing a corrected electrical colour value for each of said plurality of electrical colour values, said plurality of tone curves having the characteristic that for substantially identical neutral tones of said colour negative image a corrected electrical colour value for each of said plurality of color components is substantially identical to a corrected electrical colour value of any of said other colour components.

23. A method according to claim 22 wherein said step of scanning said colour negative image is performed on an image scanner and wherein said image scanner includes a separate channel for each of said plurality of colour components and further wherein a gain (G) and a reference voltage ($V_O$) adjustment is provided for each of said separate channels to adjust at least one of said gain (G) and said reference voltage ($V_O$) to provide a corrected electrical colour value in accordance with each of said plurality of tone curves.

* * * * *